United States Patent
Fonseca, Jr. et al.

(10) Patent No.: US 9,398,326 B2
(45) Date of Patent: Jul. 19, 2016

(54) SELECTION OF THUMBNAILS FOR VIDEO SEGMENTS

(71) Applicant: ARRIS Enterprises, Inc., Suwanee, GA (US)

(72) Inventors: Benedito J. Fonseca, Jr., Glen Ellyn, IL (US); Faisal Ishtiaq, Chicago, IL (US); Renxiang Li, Lake Zurich, IL (US); Stephen P. Emeott, Rolling Meadows, IL (US); Alfonso Martinez Smith, Algonquin, IL (US); Anthony J. Braskich, Palatine, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/302,155

(22) Filed: Jun. 11, 2014

(65) Prior Publication Data
US 2015/0365716 A1    Dec. 17, 2015

(51) Int. Cl.
*H04N 21/431*    (2011.01)
*H04N 21/482*    (2011.01)
(Continued)

(52) U.S. Cl.
CPC ...... *H04N 21/4312* (2013.01); *G06F 17/30244* (2013.01); *G06K 9/00751* (2013.01); *H04N 5/44543* (2013.01); *H04N 21/2353* (2013.01); *H04N 21/23418* (2013.01); *H04N 21/2665* (2013.01); *H04N 21/4316* (2013.01); *H04N 21/47217* (2013.01); *H04N 21/482* (2013.01); *H04N 21/8405* (2013.01);
(Continued)

(58) Field of Classification Search
CPC .......... H04N 21/4312; H04N 5/44543; H04N 21/4316; H04N 2005/44556; H04N 21/23418; H04N 21/2665; H04N 21/47217; H04N 2005/482; H04N 21/8405; H04N 21/8455; H04N 21/8456; H04N 21/8459
See application file for complete search history.

(56) References Cited

U.S. PATENT DOCUMENTS 7,212,666 B2    5/2007    Zhang et al.
8,200,648 B2    6/2012    Boiman et al.
(Continued)

FOREIGN PATENT DOCUMENTS

WO    0005884 A1    2/2000

OTHER PUBLICATIONS

Avrithis, Y., et al., "Broadcast News Parsing Using Visual Cues: A Robust Face Detection Approach", Department of Electrical and Computer Engineering, National Technical University of Athens.
Christel, M., et al., "Improving Access to a Digital Video Library", Human-Computer Interaction: INTERACT97, the 6th IFIP Conference on Human-Computer Interaction, Jul. 1997.
(Continued)

*Primary Examiner* — Benjamin R Bruckart
*Assistant Examiner* — Susan X Li
(74) *Attorney, Agent, or Firm* — Stewart M. Wiener

(57) ABSTRACT

A method of identifying a representative image of a video stream is provided. Similarity between video frames of a primary video stream relative to video frames of a different secondary video stream having similar content is evaluated and a video frame from the primary video stream having a greatest extent of similarity relative to a video frame of the secondary video stream is identified. The identified video frame is selected as an image representative of the primary video stream and may be used as an informative thumbnail image for the primary video stream. A video processing electronic device and at least one non-transitory computer readable storage medium having computer program instructions stored thereon for performing the method are also provided.

23 Claims, 10 Drawing Sheets

(51) Int. Cl.

| | |
|---|---|
| *G06F 17/30* | (2006.01) |
| *G06K 9/00* | (2006.01) |
| *H04N 5/445* | (2011.01) |
| *H04N 21/234* | (2011.01) |
| *H04N 21/235* | (2011.01) |
| *H04N 21/2665* | (2011.01) |
| *H04N 21/472* | (2011.01) |
| *H04N 21/8405* | (2011.01) |
| *H04N 21/845* | (2011.01) |
| *H04N 21/8549* | (2011.01) |

(52) U.S. Cl.
CPC ...... *H04N 21/8455* (2013.01); *H04N 21/8456* (2013.01); *H04N 21/8549* (2013.01); *H04N 2005/44556* (2013.01)

(56) References Cited

U.S. PATENT DOCUMENTS

| | | |
|---|---|---|
| 8,326,125 B2 | 12/2012 | Li et al. |
| 2005/0028194 A1* | 2/2005 | Elenbaas et al. ............ 725/32 |
| 2006/0107289 A1 | 5/2006 | DeYonker et al. |
| 2007/0126889 A1 | 6/2007 | Kim |
| 2008/0209484 A1 | 8/2008 | Xu |
| 2011/0149153 A1* | 6/2011 | Nam et al. ............ 348/468 |
| 2011/0222787 A1* | 9/2011 | Thiemert et al. ............ 382/225 |
| 2013/0093786 A1 | 4/2013 | Tanabe et al. |
| 2014/0074759 A1* | 3/2014 | Lewis et al. ............ 706/12 |
| 2014/0099034 A1 | 4/2014 | Rafati et al. |

OTHER PUBLICATIONS

Gao, X., et al., "Unsupervised Video-Shot Segmentation and Model-Free Anchorperson Detection for News Video Story Parsing", IEEE Transactions on Circuits and Systems for Video Technology, vol. 12, No. 9, Sep. 2002.

Liu, T., et al., "Shot reconstruction degree: a novel criterion for key frame selection", Pattern Recognition Letters 25, Elsevier B.V., Jul. 2004, pp. 1451-1457.

Rong, J., et al., "Key Frame Extraction Using Inter-Shot Information", Department of Computer Science and Engineering Fudan University, IEEE 2004.

Hauptmann, A., et al., "Story Segmentation and Detection of Commercials in Broadcast News Video", NSF Cooperative agreement No. IRI-9411299.

Shearer, K., et al., "Incorporating Domain Knowledge with Video and Voice Data Analysis in News Broadcasts", International Workshop on Multimedia Data Mining, Aug. 20, 2000.

F. Dufaux, Key frame selection to represent a video, Image Processing, 2000, pp. 275-278.

Y. Gao, et al., "Thematic Video Thumbnail Selection", Image Processing, 2009, pp. 4333-4336.

J.L. Lai, et al., "Key frame extraction based on visual attention model", Journal of Visual Communication and Image Representation, 2012, pp. 114-125.

PCT Search Report & Written Opinion, Re: Application No. PCT/US2015/033662; dated Sep. 14, 2015.

H. Wactlar, "Lessons Learned from Building a Terabyte Digital Video Library", retrieved from the Internet at URL: http://www.cs.cmu.edu/~wactlar/IEEEComputer_Feb99.pdf, on Sep. 1, 2015, pp. 67-68.

M. Flickner, et al., "Query by Image and Video Content: The QBIC System", IEEE Computer, vol. 28, No. 9, Sep. 1, 1995, pp. 23-32.

* cited by examiner

SELECTION OF THUMBNAILS FOR VIDEO SEGMENTS

BACKGROUND

Broadband network operators, such as multiple system operators (MSOs), distribute and deliver services such as video, audio, and multimedia content to subscribers or end-users. For example, a broadband cable network MSO may utilize resources for transmitting digital video as linear (i.e., scheduled) services or as non-linear services enabling viewers to retrieve audiovisual contents at any time independent from linear (i.e., scheduled) broadcast services.

Some non-linear content may be of a type readily capable of being presented to users in distinct segments thereby permitting the user to view any of the segments without respect to other segments and in any desired sequence. By way of example, a newscast represents a type of video that typically includes numerous distinct segments which each may be directed to a separate news worthy event or a separate topic, for instance, related to weather, sports, entertainment, or like subject matter. Thus, if the newscast is segmented into distinct parts, the viewer may consume the newscast as a non-linear service after the original broadcast of the newscast and view only the segments of the newscast of particular interest to the viewer and in any desired sequence.

When a video asset is segmented and provided as non-linear content, for instance, by an MSO as discussed above, it is typically desirable to present the viewer with separate links to the segments via a graphical user interface that includes images, typically referred to as a "thumbnails", representative of the subject matter to which the segments are directed. Accordingly, upon segmenting a video asset, it is desirable to assign thumbnails or representative images informative of the subject matter content of each segment.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a graphical user interface (GUI) or like interface is used to present links to non-linear content provided in the form of separate and distinct video segments. With such a service, the user is permitted to select and view any of the video segments without respect to the other available video segments and in any sequence. As suggested above, a newscast provides an example of a video stream that is of a type that can be readily divided into separate video segments with each segment being directed to a different news event, weather, sports, entertainment, or like subject matter. Of course, a newscast is only being disclosed for purposes of example, and embodiments disclosed herein are equally applicable to any video stream that is of a type that may be provided to users in a segmented format. By providing such a video stream in segmented form, the viewer is able to consume the content as non-linear content with control over which video segment or segments of particular interest to the viewer are played in any desired sequence.

Figure 1:
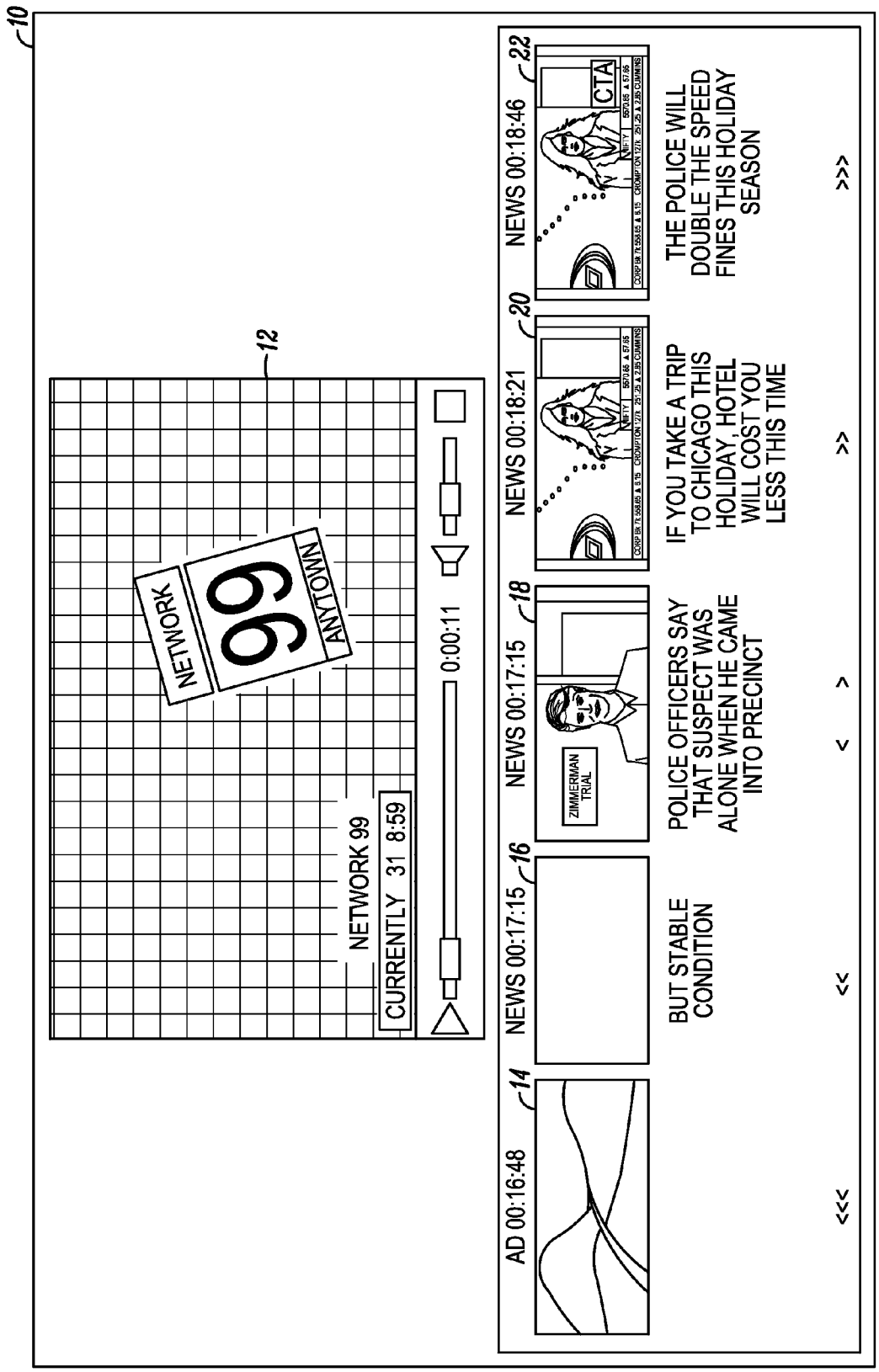
FIG. 1 is an exemplary image of a graphical user interface (GUI) having thumbnails in accordance with an embodiment.

FIG. 1 provides an example of a GUI 10, for instance, for a newscast. The main display area 12 of the GUI 10 may provide an indication of the video stream, such as the name of the particular newscast or its source. Different segments may be represented by thumbnails 14, 16, 18, 20 and 22 in the GUI 10. Thus, by selecting one of the thumbnails, the user can cause the video, audio and/or other multimedia content of the corresponding segment to be displayed or begin playing. It is preferable that the image displayed in each thumbnail 14, 16, 18, 20 and 22 is in some way representative of the subject matter content of its corresponding video segment to enable the user to readily ascertain the particular subject matter content of each segment based solely on viewing the thumbnail images and without having to actually begin to view the video segment.

If thumbnails are not manually pre-selected for each segment, which entails a highly labor intensive process considering the amount of content and variation of subject matter throughout video assets, it may be necessary to automatically generate thumbnails. As an example of one possible approach, the nth video frame of each video segment may be automatically selected as an image for a thumbnail. However, with this approach, the selected thumbnail may not necessarily represent the actual content and may not be informative as to the subject matter of the segment. For instance, each video segment may include multiple scenes and one or more scene cuts, and it may be difficult to determine which scene within a video segment is informative of, and best represents the content of, the video segment. By way of example, an image or thumbnail of a news anchor seated behind a news desk may fail to provide any relevant information as to the subject of a news segment.

According to an embodiment, a method of automatically identifying a representative image of a video segment of a primary video stream or asset utilizes at least one secondary video stream or asset for purposes of making a comparison. The secondary video stream is a video stream that is necessarily different from the first video stream but which may contain related, overlapping, or similar content. For example, if the primary video stream or asset is a newscast, the secondary video stream may be a similar newscast obtained from another source or channel or may be a newscast from the same producer, source or channel that may have preceded the primary video stream by a few hours or other acceptable time period. Thus, similar news topics may be presented in the primary and secondary video streams or assets; however, not necessarily in an identical format or sequence.

In the above referenced embodiment, the process may include the computation or development of some form of similarity metric for purposes of making a comparison between the primary and secondary video assets. For example, features, such as image descriptors, generated at a selected time point or frame time of the primary digital video stream may be compared to similar features generated at numerous time points or frame times of the secondary digital video stream for purposes of determining the similarity of the features. Such a process may be repeated for various time points or frame times of the primary video stream for purposes of computing the similarity metric corresponding to each time point, frame time, or video frame. The computed similarity metrics can then be used to automatically select a video frame or frames of the primary video stream having the highest similarity to a video frame or frames of the secondary video stream for use as a thumbnail to present to a viewer in a GUI. By way of example, video frames within two different newscasts that have high similarity according to the above process should represent video frames that will be most relevant to a viewer in promptly ascertaining an understanding of the nature of the content of the corresponding video segment.

With respect to the above discussed newscast example, the process of the embodiment may include a MSO receiving a newscast of a first video asset and segmenting the video asset into separate and distinct segments. For each segment, the MSO may extract audio, video, and/or text features or descriptors at various time points of the segment. In addition, the MSO accesses a second newscast from another source such as a newscast from a different channel or from the same producer at an earlier time. Such second newscast may have been aired in the same day or within a few hours from the first newscast so that the newscasts are likely to contain overlapping subject matter. The MSO extracts text, audio and/or video features or descriptors at various time points from the second newscast. The MSO then evaluates similarity of the extracted features by computing a similarity metric. For instance, the text, audio and/or video features at each of the time points of a segment of the first newscast may be compared to the text, audio and/or video features at time points of the second newscast. The time point in the first video stream that provides a highest similarity metric with any time point in the second video stream is automatically selected as the thumbnail representative image for the segment of the first newscast. These steps can be repeated for each of the segments of the first newscast to generate an array of thumbnails for the segmented first newscast.

Figure 2:
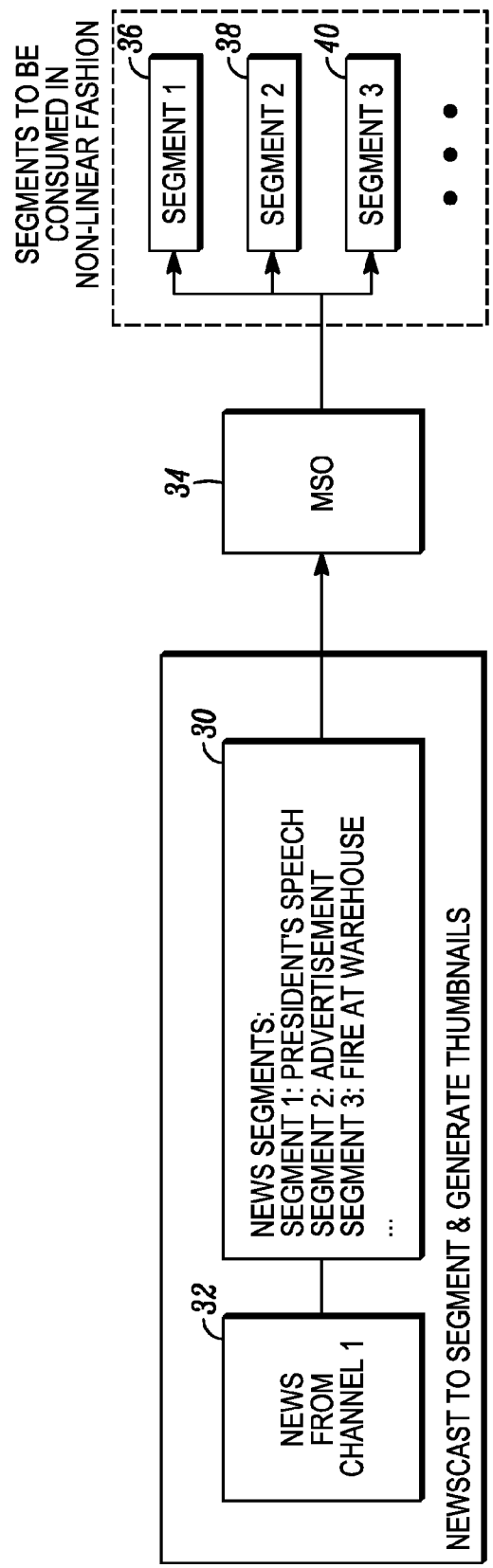
FIG. 2 is a diagram representing a process for segmenting a first video stream in accordance with an embodiment.

FIGS. 2-9 provide an example of the above referenced method applied to a newscast asset. In FIG. 2, a first newscast 30 is provided from a source 32 to a service provider, or MSO, 34 in the form of a digital video stream that may include audio, multimedia, closed captions, metadata, and the like. The service provider 34 segments the various sections of the first newscast 30 such that the segments, such as video segments 36, 38 and 40, may be consumed by end users in a non-linear fashion via use of a GUI, such as shown in FIG. 1. As shown in the example provided by FIG. 2, "segment 1" (reference numeral 36) may be directed to a new event including a president's speech, "segment 2" (reference numeral 38) may be an advertisement, and "segment 3" (reference numeral 40) may be a news event with respect to a fire at a warehouse. The service provider 34 may use text, audio and/or video features or the like to segment the first newscast 30 and determine where each segment begins and ends. In some embodiments, the segments' contents are not necessarily labeled; in other embodiments, the segments' contents may have been labeled by a system that provides automatic topic summarization.

Figure 3:
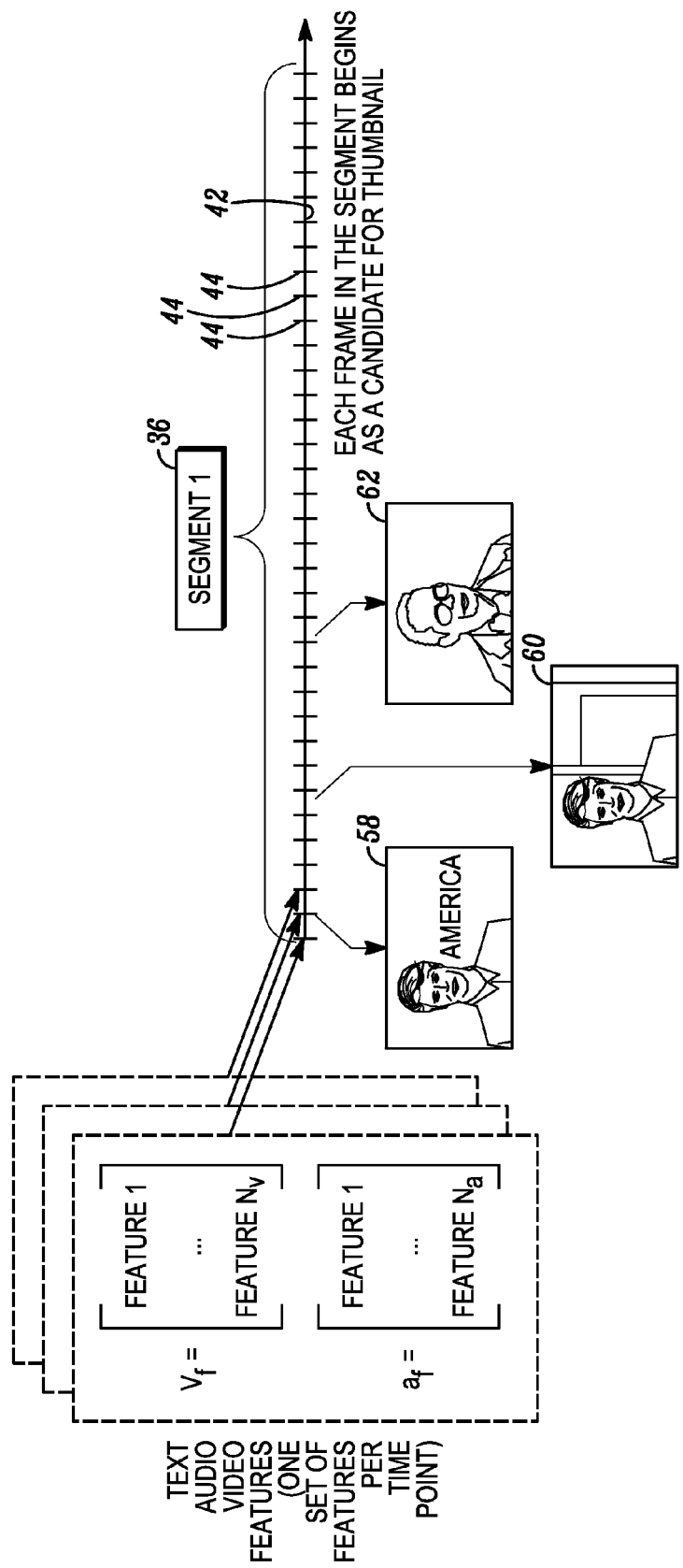
FIG. 3 is a diagram representing a process for extracting features from video frames of the first video stream in accordance with an embodiment.

The video timeline 42 in FIG. 3 shows a plurality of time points 44 along the digital video stream of the segment 36 of the first newscast 30. The time points 44 may represent frame times or the first frame time of a group of consecutive frames. For each time point, or for each selected time point, on the timeline 42, a set of features can be extracted. For instance, 1 to $N_v$ video features ($v_f$) may be extracted and 1 to $N_a$ audio features ($a_f$) may be extracted for each time point subject to evaluation. Text features may also be extracted, such as text appearing directly within the video frame or text contained in closed caption data or metadata corresponding to the time point or corresponding video frame.

As an example, the features may be visual descriptors or image descriptors of the visual features of the contents in images, video frames, or videos. The features may be used to describe elementary characteristics such as shape, color, texture or motion. Color Layout Descriptors (CLDs) and Edge Histogram Descriptors (EHDs) provide two examples of features that can be used. A set of Color Layout Descriptors (CLDs) can be used to capture spatial distribution of color in an image or frame of video, and a set of Edge Histogram Descriptors (EHDs) can be used to capture the texture of an image. Accordingly, when such features or descriptors of two similar images are compared, the comparison will produce a similarity metric indicating high similarity. In contrast, when such features or descriptors of two significantly different images are compared, the comparison will produce a similarity metric indicated low or no similarity.

There are many ways to compute the similarity metric. In one embodiment, the similarity metric is obtained by computing the inner product between two vectors containing video features. For instance, if the video feature corresponds to color layout descriptors, the inner product between the vector of coefficients in the color layout descriptor of a first image and the corresponding vector of coefficients of a second image would provide a similarity metric. In another embodiment, the similarity metric is obtained from the weighted sum of the square of the difference between the coefficients in the color layout descriptor of a first image and the corresponding coefficients of the color layout descriptor of a second image.

With respect to the newscast example, the use of unique graphics (banners, framing, etc.) added by producers, for instance, of different channels, may need to be considered when making such comparisons as the graphics themselves may alter the outcome. For at least this purpose, the determination and use of audio features or descriptors or text features may be particularly useful when the content, such as a news piece, is about or contains a particular object, person, or event, such as a president's speech, an official's statement, explosions, crowd noise, sirens, or the like.

Each video frame of the video stream of the segment 36 may be evaluated and considered as a candidate for selection as a thumbnail for the segment 36. According to one embodiment, each video frame is subject to evaluation as a candidate, and according to other embodiments, only selected video frames are subject to evaluation as a candidate. For example, the number of video frames subject to evaluation as a candidate may be reduced by restricting candidates to video frames occurring only at a scene cut within the segment. Other criteria may also be used, such as video frames occurring at preset intervals along timeline 42 or the like. Thus, all video frames may be considered and evaluated as candidates for use as a thumbnail or only video frames located at predetermined intervals, at scene cuts, or the like may be considered and evaluated as candidates.

Figure 4:
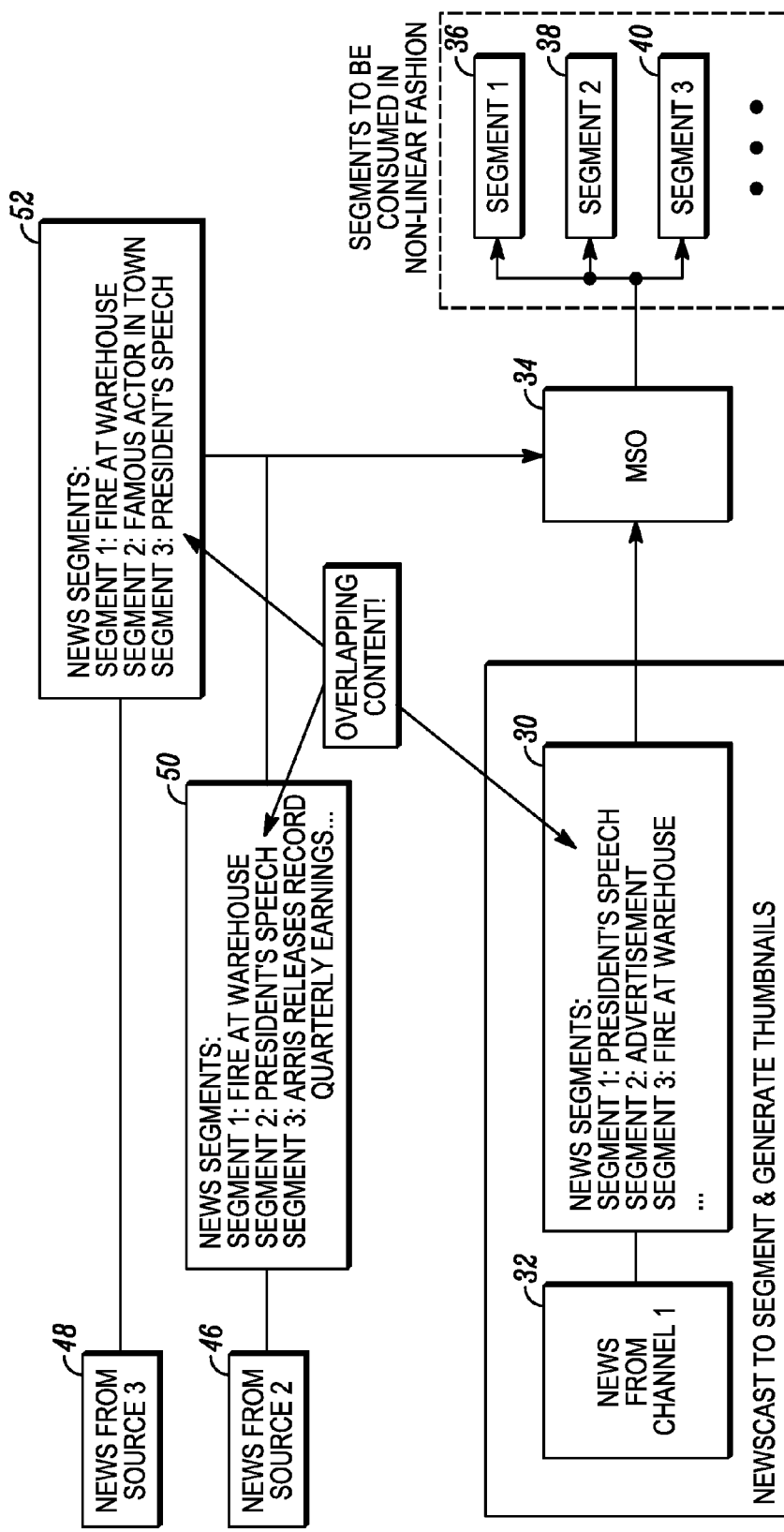
FIG. 4 is a diagram representing a process for obtaining a second video stream having overlapping content with the first video stream in accordance with an embodiment.

In FIG. 4, the service provider 34 accesses video streams and assets from other sources 46 and 48 that are not identical to the first newscast 30 but which may contain similar or overlapping content. For example, a second newscast 50 and a third newscast 52 that was produced relatively close in time to the first newscast 30 may be obtained. The second or third newscasts 50 and 52 may be from a preceding day or from earlier in the same day, for instance, within three hours or like predetermined time period. As shown in FIG. 4, preferably the second and/or third newscasts 50 and 52 should have similar or overlapping content, although not necessarily provided in the same sequence as the first newscast 30.

Figure 5:
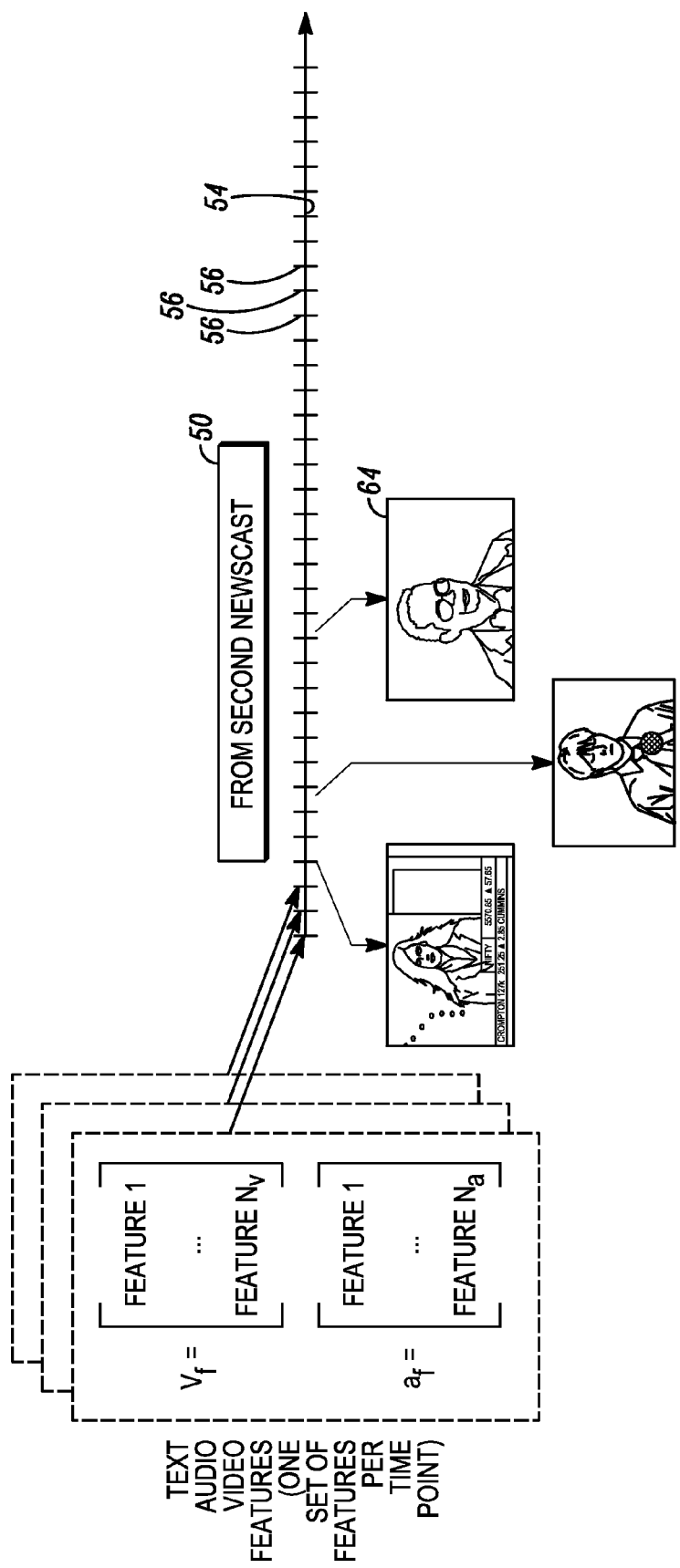
FIG. 5 is a diagram representing a process for extracting features from video frames of the second video stream in accordance with an embodiment.

As shown in FIG. 5, a video timeline 54 shows a plurality of time points 56 along the video stream of the second newscast 50. The time points 56 may represent frame times or the first frame time of a group of consecutive frames. For each time point or for selected time points along the timeline 54, a set of features or descriptors can be extracted as accomplished for the first newscast 30. For instance, 1 to $N_v$ video features $(v_f)$ can be extracted and 1 to $N_a$ audio features $(a_f)$ may be extracted for each time point being evaluated. Text features may also be extracted, such as text appearing within the video frame or text within closed caption data or metadata corresponding to the video frame. Each video frame of the entire video stream of the second newscast 50 may be evaluated or evaluation may be limited to video frames determined to be scene cuts or the like. Thus, all video frames may be used or only a subset of selected video frames may be considered in computing similarity metrics.

Figure 6:
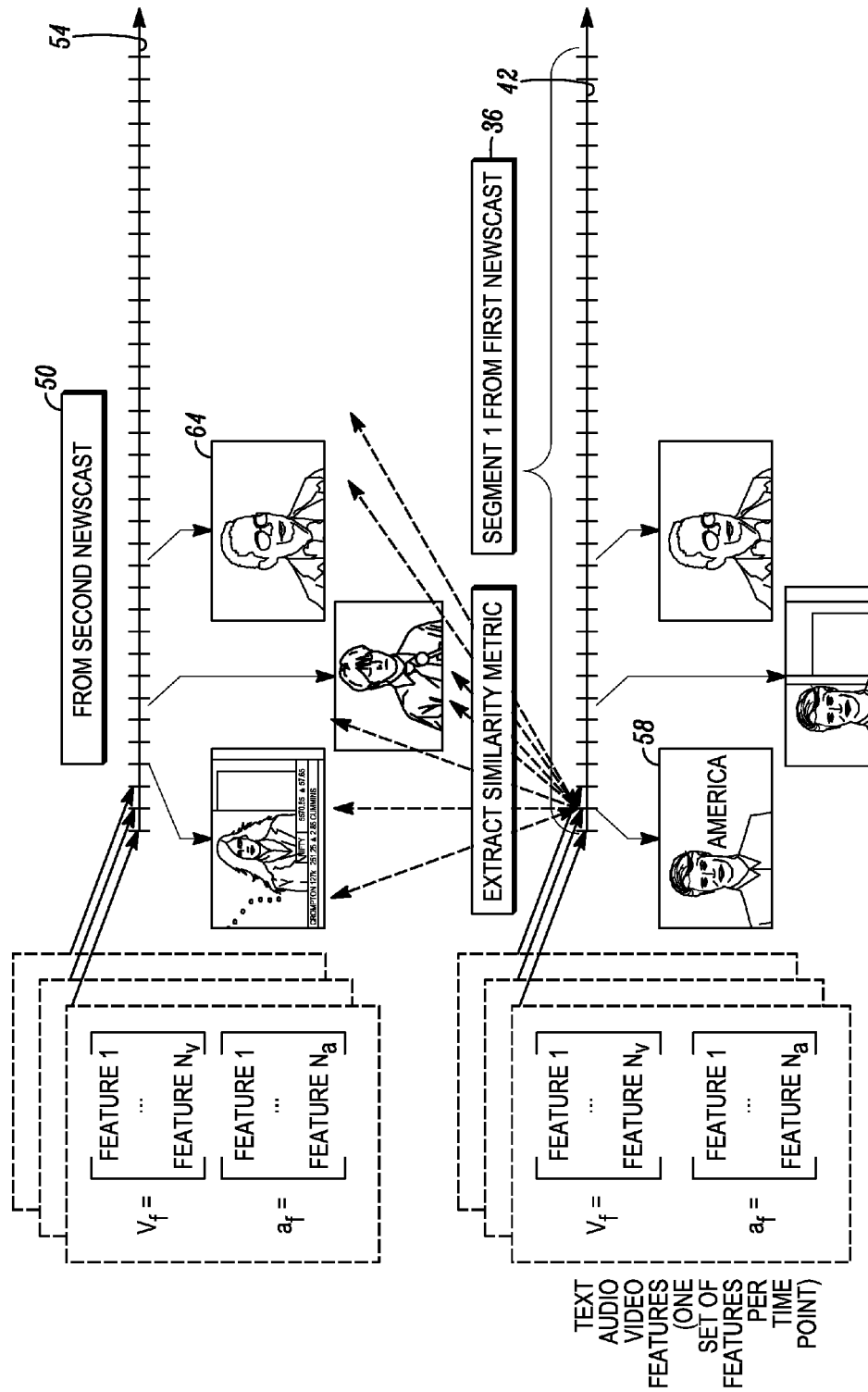
FIG. 6 is a diagram representing a process for determining a similarity metric between a first selected video frame of the first video stream and video frames of the second video stream in accordance with an embodiment.

FIG. 6 shows the timeline 42 of the video segment 36 of the first newscast 30 relative to the timeline 54 of the entire second newscast 50 or relevant sections thereof. A similarity metric is computed for each time point, frame time, or video frame of the video segment 36 considered as a candidate for use as a thumbnail relative to each time point, frame time, or video frame of the second newscast 50. The purpose of the similarity metric is to identify a video frame in the segment 36 that closely matches a video frame in the second newscast 50 so that such a video frame of the segment 36 can be used as a representative image or thumbnail for the segment 36 of the first newscast 30.

Figure 7:
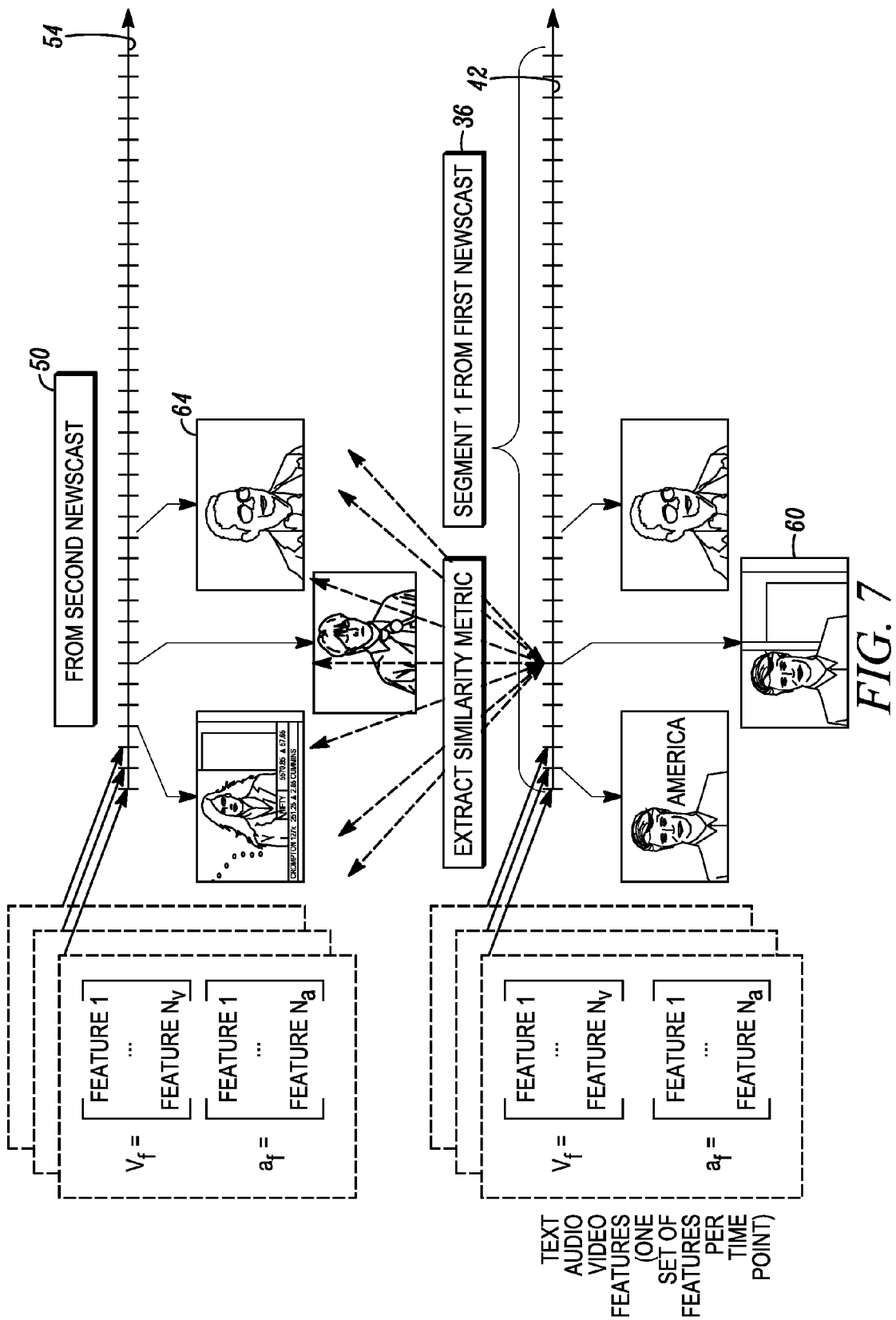
FIG. 7 is a diagram representing a process for determining a similarity metric between a second selected video frame of the first video stream and video frames of the second video stream in accordance with an embodiment.
Figure 8:
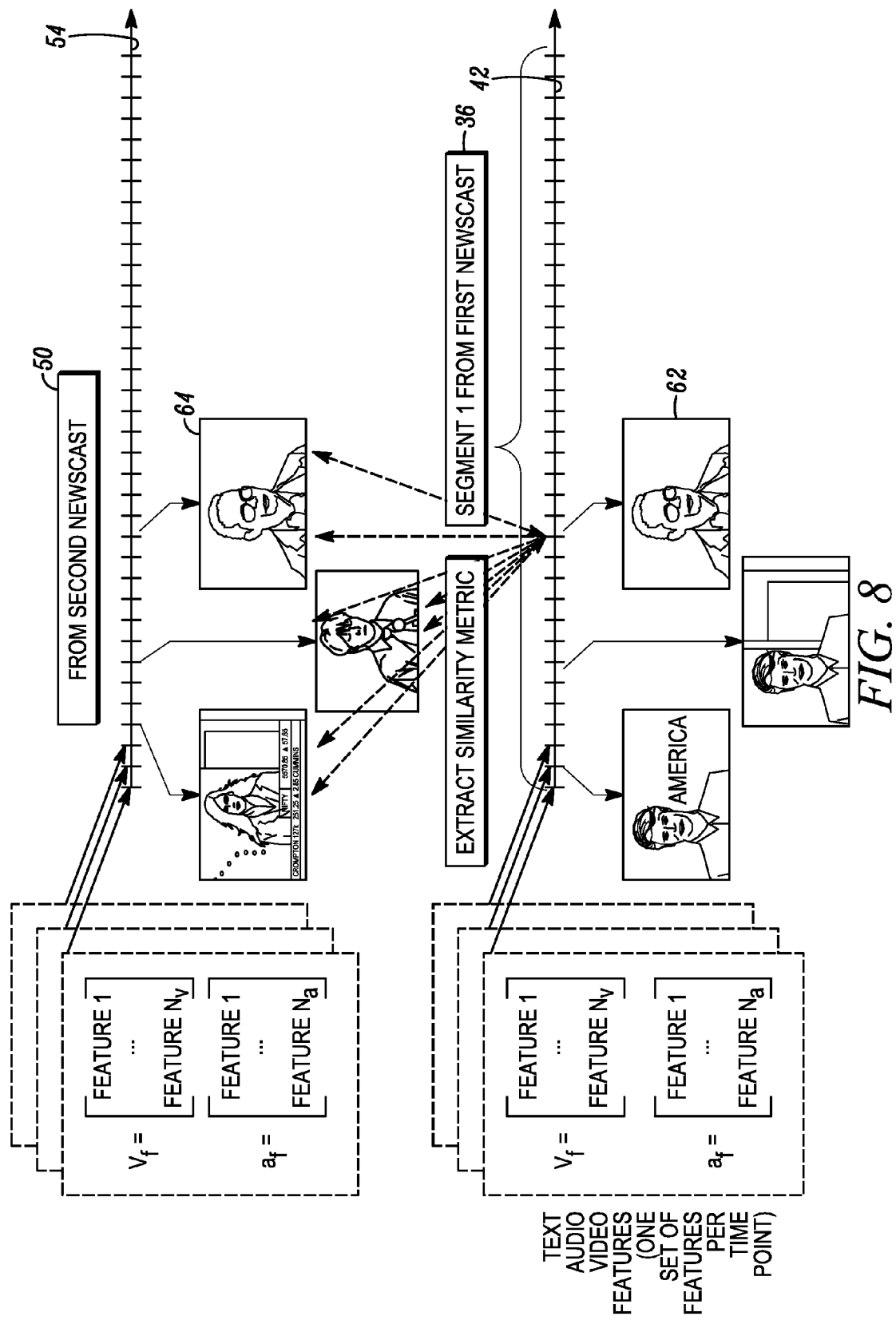
FIG. 8 is a diagram representing a process for determining a similarity metric between a third selected video frame of the first video stream and video frames of the second video stream in accordance with an embodiment.
Figure 9:
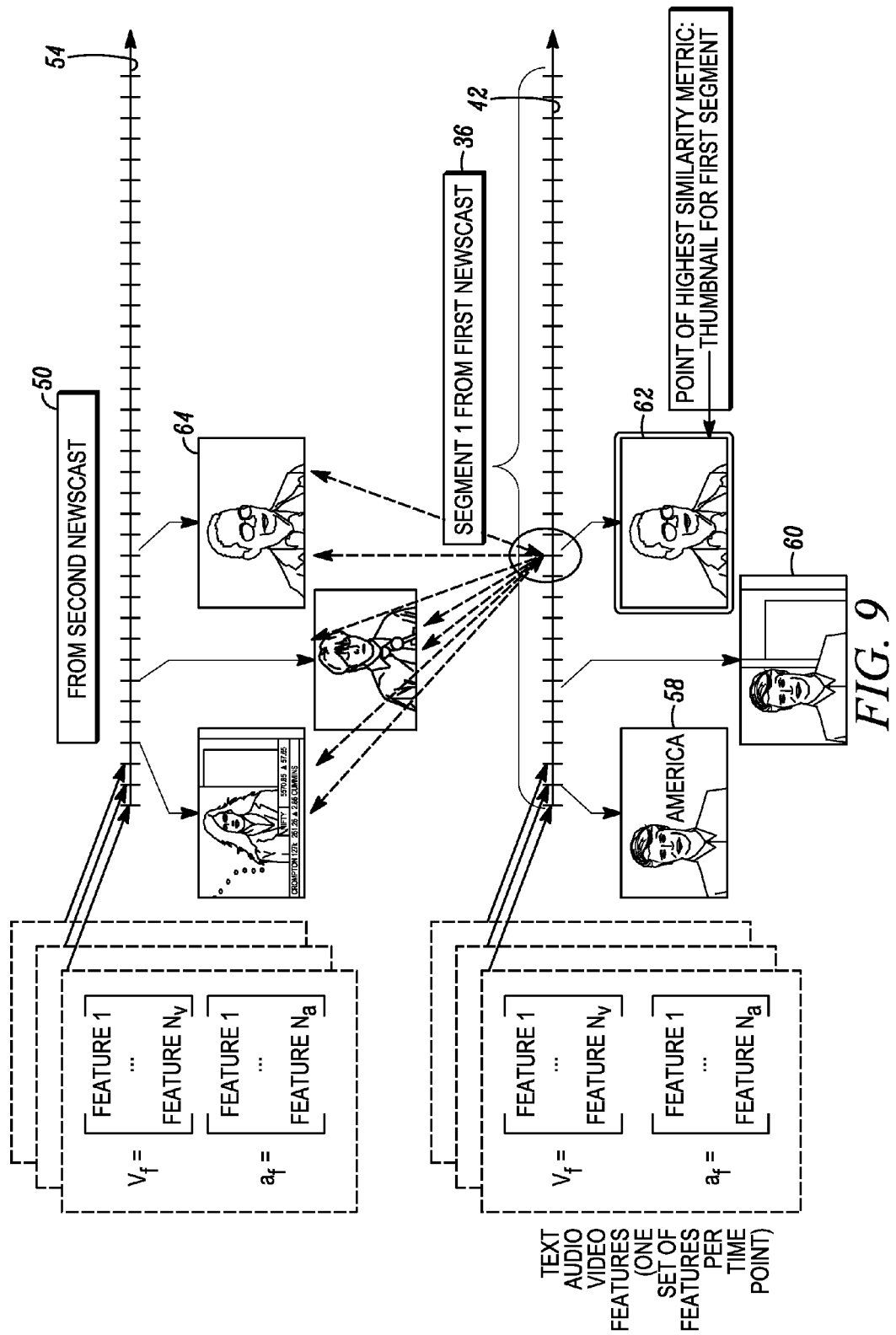
FIG. 9 is a diagram representing selection of a representative image for use as a thumbnail for a first segment of the first video stream in accordance with an embodiment.

By way of example, the set of features determined and corresponding to video frame 58 of the video segment 36 of the first newscast 30 are separately compared to each of the sets of features determined for each or selected ones of the time points or video frames of the second newscast 50. FIG. 7 shows this process repeated for another time point of the segment 36 corresponding to video frame 60, and FIG. 8 shows this process repeated for a further time point of the segment 36 corresponding to video frame 62. FIG. 9 shows the result of all of the above referenced comparisons. The time point corresponding to video frame 62 is determined to have the greatest amount of similarity, based on a comparison of extracted features, with a time point corresponding to video frame 64 of the second newscast 50. Here, segment 36 of the first newscast 30 is directed to a president's speech. The second newscast 50 also covered the president's speech in a second segment thereof. Thus, the video frames 62 and 64 showing the president giving a speech provides the highest similarity metric computed between frames of segment 36 relative to frames of the second newscast 50 and is therefore automatically selected for use as a thumbnail representative of the content of video segment 36 of the first newscast 30.

The process shown in FIGS. 6-9 may be repeated for each of the segments of the first newscast 30, such as segments 38 and 40. Thus, a different thumbnail may be automatically selected for each of the segments 36, 38 and 40 of the first newscast 30, and each of the selected thumbnails should be informative of the content each segment. The selected representative images may be used as thumbnails for display in a user interface such as shown in FIG. 1 and displayed to a subscriber of the service provider 34 for use in selecting and viewing any of the segments in the form of non-linear content.

Figure 10:
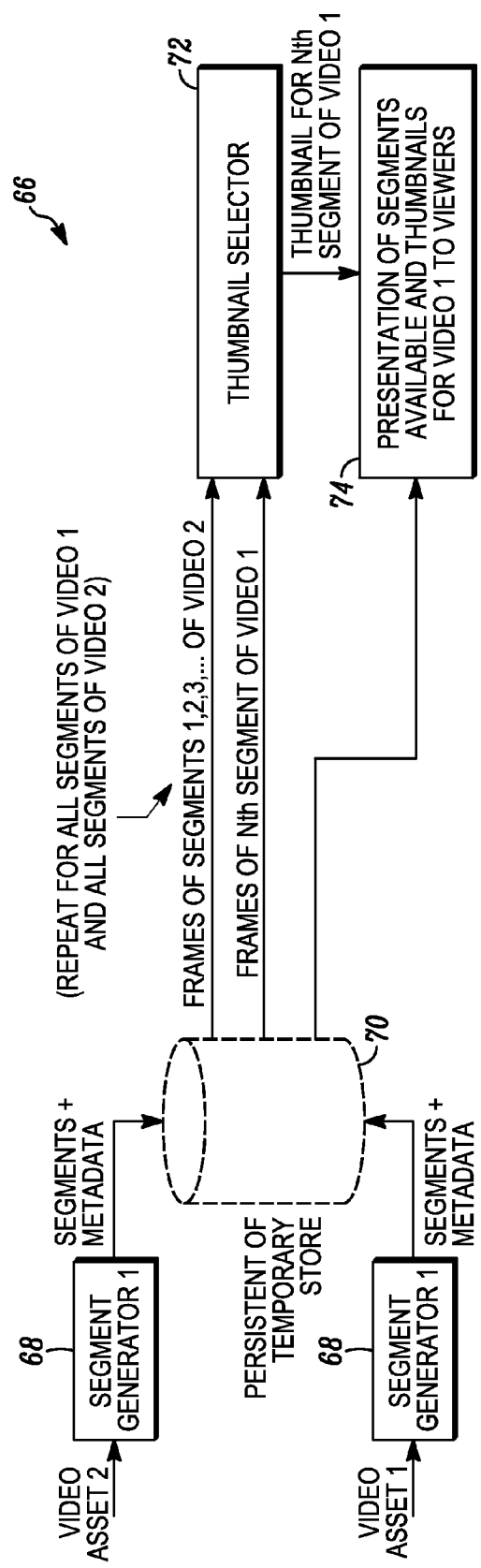
FIG. 10 is a diagram of system architecture including a thumbnail selector in accordance with an embodiment.

An embodiment of a system 66 of electronic video processing apparatus for automatically performing the above method is shown in FIG. 10. The system 66 may include one or more segment generators 68 for receiving first, second, third, etc. video streams. Each segment generator 68 segments the video streams including applicable metadata such as closed caption information or the like. The various segments of the various streams may be stored in a storage unit 70. A thumbnail selector 72 including one or more processors may be configured to extract features from the segments of a primary video stream and make comparisons with secondary video streams to determine video frames of highest similarity so that thumbnails can automatically be selected for each segment of a primary video stream or asset as discussed above. Thus, features and/or descriptors and similarity metrics can be computed between each time point or interval of the first video sequence and all of the time points or intervals of the second video sequence. The automatically selected thumbnails can then be used in a user interface 74 to provide informative representative images to potential viewers of any of the video segments.

Accordingly, a thumbnail can be generated automatically for a first video stream, or for segments thereof, based on a comparison of features of video frames with a secondary video stream of similar nature and content. In this manner, the most relevant video frame can be identified based on the comparison of video frames and features computed therefrom and an informative thumbnail can be provided.

Various modifications can be made to the above referenced embodiments. For example, the time points in the primary video representing candidate video frames subjected to evaluation and consideration as thumbnail images may be selected based on frame times, regularly spaced time points in the video segment (e.g., every 5 seconds of video), time points in the video in which a scene cut appears and can be detected, time points in the video in which audio characteristics change, time points in the video in which the short-term statistics of any combination of text, audio, and video features change by a predetermined threshold amount, or on any basis.

For example, if limiting the number of candidates to be subject to evaluation is desired, for instance, for purposes of reducing processing time or requirements of the video stream, the time points of the video streams of the first segment under analysis and the various time points of the second or other video asset may be trimmed. For instance, as suggested above, the number of candidate time points for evaluation as thumbnails may be restricted solely to time points in the video streams which involve scene cuts.

Another alternative is to calculate a similarity metric of text, audio and video features between a desired segment of the first video stream and text, audio and video features from other segments of the first video stream (i.e., of the same asset). This process step can be used for purposes of excluding many time points in the video stream under analysis in which, for instance, a newscaster appears since the same newscaster may appear in many points of the newscast and may not be informative of the subject matter of the segment. With this step, similar video frames occurring within the same video asset may be eliminated from being evaluated and considered as a candidate for use as a thumbnail.

According to another embodiment, a set of filters is applied to the video frames of the segment of the first video stream under analysis for purposes of excluding some of the frames from further evaluation. For example, face recognition techniques and software could be used to exclude frames containing faces from known news anchors and reporters. Alternatively, speech recognition techniques and software may be used to exclude portions of the video segments that contain speech from known news anchors and reporters. Still further, object detection techniques and software may be used to enhance the selection of thumbnails. For instance, if text or keywords in the closed captions of the segment being evaluated concerns airplanes or some other object, only the frames of the video segment of the first video stream that contain one or more airplanes would be considered as candidates for evaluation for thumbnail selection. Furthermore, only frames of the second video segment that contain one or more airplanes or other object may be used to compute the similarity metric.

Yet a further embodiment may utilize face detection techniques and software to enhance the selection of thumbnails. For example, if text analysis of the closed captions of the video segment identifies that the news segment is about a person, athlete, or celebrity, then only video frames of the first video segment that contain one or more of the identified faces would be considered as candidates for evaluation as thumbnails. Furthermore, only frames of the second video segment that contain one or more of the identified faces would be used to compute the similarity metric.

Similarity metrics of text, audio, and video features may be calculated between a desired segment of a primary video stream and text, audio, and/or video features from other segments of previous assets of the same channel or producer. Here, if an image appears in several days of a newscast, it is likely that this image does not represent images from news of the current day. Since some news pieces may be relevant for a duration of several days, even weeks or months, when using this particular technique, a candidate time point would only be eliminated from further evaluation if it has a relatively high similarity with previous images of most or all of the previous newscasts for a period of time. Various modifications can be made to these embodiments with respect to reducing the number of video frames that are ultimately subject to evaluation as candidates for use as a thumbnail.

In accordance to another embodiment, each segment of the primary and secondary video streams may be subject to initial partitioning into parts. One part may be video including an anchor or reporter and another part may be video in which an anchor or reporter is not detected. Thereafter, evaluation of candidate video frames may proceed only for video frames in the part of the video in which an anchor or reporter is not detected in the primary video stream and the video frames of the secondary video stream.

A further embodiment with respect to evaluating and comparing video frames for similarity may require the similarity metric to be computed based on a collective similarity metric involving use of a group of two or more consecutive frames of a segment of a first video stream relative to a group of two or more consecutive frames of a second video stream. Thus, evaluation may involve a similarity metric determined based on a comparison of features of an individual video frame relative to other individual video frames, or evaluation may involve a collective similarity metric obtained for a number of consecutive video frames. In the latter case, a thumbnail for a video segment of the first video stream may be selected as the nth frame of the group of consecutive video frames determined to have the greatest similarity metric. As another alternative, the thumbnail could be provided as a short video clip of the selected group of consecutive video frames instead of a static image.

As a further option, a single set of features may be extracted from the video of the group of two or more consecutive frames of the segment of the first video stream and the same set of features may be extracted from the video of the group of two or more consecutive frames of the second video stream. The similarity metric can then be computed based on a comparison between the two sets of extracted features.

According to another embodiment, if a second newscast is used to generate a thumbnail for a segment of a first newscast, the first newscast may be used to generate a thumbnail for a corresponding segment of the second newscast. Thus, the first and second video stream would simultaneously be subject to evaluation and thumbnail selection process. In addition, as segments from different video streams are determined to refer to the same content, links between such segments can be automatically generated and provided to the viewer in the user interface.

According to another embodiment, keywords obtained from a closed-caption stream or other metadata provided with the video streams can be utilized in the thumbnail selection process. For example, keywords in a segment of the primary video stream could be identified and used in searches for secondary videos containing like keywords. Thus, video streams on the Internet, YouTube, or like sources could be searched and identified as an asset directed to similar content. Thus, a similarity metric as discussed above could be computed between video frames of a video segment of the first video stream and the YouTube or like content obtained in the keyword search.

Thus, any of the embodiments disclosed above may also include process steps for selecting other secondary video stream sources for comparison to the primary or first video stream. For example, these steps may include verifying the genre of the first asset (i.e., the asset for which a thumbnail is needed), verifying the genre of any other available asset, and selecting one or more of the other available assets based on the asset being of the same genre as the first asset. According to some embodiments, one or more assets with a different genre may be selected if a sufficiently high similarity metric could not be contained with the initially selected other assets.

As a further alternative, keywords from the closed captions of the segment in the first asset (i.e., the asset for which a thumbnail is needed) may be identified and extracted, the closed captions of other available assets can be identified and extracted, and selection of assets having keywords in common with the first asset can be selected. In some embodiments, only closed captions/keywords of assets that have the same genre as the first asset may be searched.

While most of the above examples primarily focus on automatically identifying thumbnails for newscasts, this is only provided by way of example. The above methods and systems can be applied to other video streams. For example, the above techniques can be applied to video stream that have different segments including talk shows, sports shows, late-night shows, variety shows, music shows, and the like.

The above referenced system, apparatus, and processing units may include various processors, microprocessors, controllers, chips, disk drives, and like electronic components, modules, equipment, resources, servers, and the like for carrying out the above methods and may physically be provided on a circuit board or within another electronic device. It will be apparent to one of ordinary skill in the art that the processors, controllers, modules, and other components may be implemented as electronic components, software, hardware or a combination of hardware and software.

For example, at least one non-transitory computer readable storage medium having computer program instructions stored thereon that, when executed by at least one processor, can cause the at least one processor to automatically select thumbnails for a video stream as described in the above embodiments.

In the foregoing specification, specific embodiments have been described. However, one of ordinary skill in the art appreciates that various modifications and changes can be made without departing from the scope of the embodiments as set forth in the claims below. Accordingly, the specification and figures are to be regarded in an illustrative rather than a restrictive sense, and all such modifications are intended to be included within the scope of the embodiments.

We claim:

1. A method of identifying a representative image of a video stream, further comprising:
    selecting a plurality of secondary video streams for comparison to a primary video stream;
    identifying, from the plurality of secondary video streams selected for comparison to the primary video stream, a plurality of video assets aired over a plurality of days and each having common program metadata;
    identifying a plurality of video frames of each video asset having high similarity to one another;
    computing a similarity metric for at least one secondary video stream of the plurality of secondary video streams, by evaluating similarity of content between the primary video stream and the at least one secondary video stream, excluding the identified video frames from the evaluating;
    selecting a plurality of video frames from at least one secondary video stream of the plurality of secondary video streams based at least on the similarity metric of the plurality of video frames relative to the primary video stream;
    identifying at least one video frame from the primary video stream, based at least on the similarity metric, having greatest similarity relative to the selected plurality of video frames; and
    selecting the at least one video frame identified in said identifying step as an image representative of the primary video stream for use as thumbnail for the primary video stream.

2. The method of claim 1, the computing step further comprising computing the similarity metric between video frames of the primary video stream and video frames of the at least one secondary video stream.

3. The method of claim 2, wherein said identifying step includes selecting a video frame of the primary video stream corresponding to a similarity metric indicating greatest similarity.

4. The method of claim 2, further comprising extracting features from said video frames of said primary video stream and video frames of said secondary video stream and comparing said features.

5. The method of claim 4, wherein said features include at least one of video, text, and audio features.

6. The method of claim 2, wherein the video frames of the primary video stream used during said computing step are selected from a group consisting of all video frames, video frames at predetermined intervals, video frames corresponding to scene cuts, video frames in which at least one of video, text and audio features change.

7. The method of claim 6, wherein the video frames of the secondary video stream used during said computing step are selected from a group consisting of all video frames, and video frames corresponding to scene cuts.

8. The method of claim 2, wherein the similarity metric is computed between a group of two or more consecutive video frames of the primary video stream and two or more consecutive frames of the secondary video stream.

9. The method of claim 1, further comprising the step of causing the identified video frame to be displayed as a thumbnail for representing the primary video stream in a user interface.

10. The method of claim 1, further comprising the step of dividing the primary video stream into a plurality of video segments and repeating said evaluating, identifying and selecting steps for each of the plurality of video segments such that a different representative image is selected for each of the plurality of video segments.

11. The method of claim 10, wherein the secondary video stream includes a plurality of segments, and wherein the representative image selected during said selecting step for one of the plurality of video segments of the primary video segment is selected as a representative image of a corresponding segment in the secondary video segment.

12. The method of claim 10, further comprising the steps of:
    calculating a similarity metric between video frames of one of the plurality of video segments of the primary video stream and video frames of at least a different one of the plurality of video segments of the primary video stream before said evaluating step; and
    excluding video frames of the primary video stream from said evaluating step that have similarity metrics, determined during said calculating step, to exceed a preset threshold.

13. The method of claim 1, wherein the primary video stream corresponds to a newscast and the secondary video stream corresponds to an earlier newscast relative to the newscast of the primary video stream.

14. The method of claim 13, further comprising the steps of:
    identifying video frames including news anchors or reporters in the primary and secondary video streams before said evaluating step; and
    excluding the video frames including news anchors or reporters from said evaluating step.

15. The method of claim 1, further comprising the step of obtaining the secondary video stream by searching keywords from a closed caption stream of the primary video stream.

16. The method of claim 1, further comprising the steps of:
obtaining keywords from a closed caption stream of the primary video stream;
identifying video frames in the primary and secondary video streams including objects or persons corresponding to the keywords; and
performing said evaluating step only with video frames of the primary and secondary video streams including objects or persons corresponding to the keywords.

17. The method of claim 1, wherein the step of selecting the plurality of secondary video streams for comparison to the primary video stream further comprises:
selecting at least one of the plurality of secondary video streams based at least on an airing of the at least one secondary video stream, within a same day or a number of hours of an airing of the primary video stream.

18. The method of claim 1, wherein the step of selecting the plurality of secondary video streams for comparison to the primary video stream further comprises:
selecting at least one of the plurality of secondary video streams based at least on having a genre that is same as a genre of the primary video stream.

19. The method of claim 1, wherein the step of selecting the plurality of secondary video streams for comparison to the primary video stream further comprises:
selecting at least one of the plurality of secondary video streams based at least on having a genre that is different from a genre of the primary video stream.

20. A video processing electronic device for automatically identifying a representative image of a video stream, comprising at least one processing unit configured to:
select a plurality of secondary video streams for comparison to a primary video stream;
identify, from the plurality of secondary video streams selected for comparison to the primary video stream, a plurality of video assets aired over a plurality of days and each having common program metadata;
identify a plurality of video frames of each video asset having high similarity to one another;
compute a similarity metric for at least one secondary video stream of the plurality of secondary video streams, by evaluating similarity of content between the primary video stream and the at least one secondary video stream, excluding the identified video frames from the evaluating;
select a plurality of video frames from at least one secondary video stream of the plurality of secondary video streams based at least on the similarity metric of the plurality of video frames relative to the primary video stream;
identify at least one video frame from the primary video stream, based at least on the similarity metric, having greatest similarity relative to the selected plurality of video frames; and
select the at least one video frame identified in said identifying step as an image representative of the primary video stream for use as thumbnail for the primary video stream.

21. The video processing electronic device of claim 20, wherein said at least one processing unit is configured to compute a similarity metric between video frames of the primary video stream and video frames of the secondary video stream and to select a video frame of the primary video stream corresponding to a highest similarity metric computed.

22. The video processing electronic device of claim 21, wherein said at least one processing unit is configured to compute the similarity metric by extracting features from said video frames of said primary video stream and video frames of said secondary video stream and to compare said features, wherein said features include at least one of video, text, and audio features.

23. At least one non-transitory computer readable storage medium having computer program instructions stored thereon that, when executed by at least one processor, cause the at least one processor to automatically identify a representative image of a video stream by performing the following operations:
select a plurality of secondary video streams for comparison to a primary video stream;
identify, from the plurality of secondary video streams selected for comparison to the primary video stream, a plurality of video assets aired over a plurality of days and each having common program metadata;
identify a plurality of video frames of each video asset having high similarity to one another;
compute a similarity metric for at least one secondary video stream of the plurality of secondary video streams, by evaluating similarity of content between the primary video stream and the at least one secondary video stream, excluding the identified video frames from the evaluating;
select a plurality of video frames from at least one secondary video stream of the plurality of secondary video streams based at least on the similarity metric of the plurality of video frames relative to the primary video stream;
identify at least one video frame from the primary video stream, based at least on the similarity metric, having greatest similarity relative to the selected plurality of video frames; and
select the at least one video frame identified in said identifying step as an image representative of the primary video stream for use as thumbnail for the primary video stream.

* * * * *